United States Patent
Basu et al.

(10) Patent No.: US 8,484,083 B2
(45) Date of Patent: Jul. 9, 2013

(54) METHOD AND APPARATUS FOR TARGETING MESSAGES TO USERS IN A SOCIAL NETWORK

(75) Inventors: Sugato Basu, Redwood City, CA (US); Jiye Yu, Menlo Park, CA (US); Jeffrey Davitz, Danville, CA (US); Mark Drummond, Los Altos Hills, CA (US)

(73) Assignee: SRI International, Menlo Park, CA (US)

( * ) Notice: Subject to any disclaimer, the term of this patent is extended or adjusted under 35 U.S.C. 154(b) by 973 days.

(21) Appl. No.: 12/002,412

(22) Filed: Dec. 17, 2007

(65) Prior Publication Data

US 2008/0275849 A1    Nov. 6, 2008

Related U.S. Application Data

(60) Provisional application No. 60/887,778, filed on Feb. 1, 2007, provisional application No. 60/892,824, filed on Mar. 2, 2007.

(51) Int. Cl.
*G06Q 30/00* (2012.01)

(52) U.S. Cl.
USPC .................. 705/14.66; 705/14.72; 705/14.73

(58) Field of Classification Search
None
See application file for complete search history.

(56) References Cited

U.S. PATENT DOCUMENTS

| | | | |
|---|---|---|---|
| 2002/0026360 A1* | 2/2002 | McGregor et al. | 705/14 |
| 2002/0062368 A1* | 5/2002 | Holtzman et al. | 709/224 |
| 2003/0033199 A1* | 2/2003 | Coleman | 705/14 |
| 2003/0055711 A1* | 3/2003 | Doherty | 705/10 |
| 2004/0034652 A1* | 2/2004 | Hofmann et al. | 707/102 |
| 2005/0256905 A1* | 11/2005 | Gruhl et al. | 707/104.1 |
| 2006/0200435 A1* | 9/2006 | Flinn et al. | 706/12 |
| 2006/0218225 A1* | 9/2006 | Hee Voon et al. | 709/201 |
| 2006/0271526 A1* | 11/2006 | Charnock et al. | 707/3 |
| 2006/0282303 A1* | 12/2006 | Hale et al. | 705/10 |
| 2006/0282328 A1* | 12/2006 | Gerace et al. | 705/14 |
| 2007/0016553 A1* | 1/2007 | Dumais et al. | 707/2 |
| 2007/0214097 A1* | 9/2007 | Parsons et al. | 706/12 |
| 2007/0240119 A1* | 10/2007 | Ducheneaut et al. | 717/124 |
| 2007/0288602 A1* | 12/2007 | Sundaresan | 709/219 |
| 2008/0059897 A1* | 3/2008 | Dilorenzo | 715/764 |
| 2008/0133370 A1* | 6/2008 | Gehlot et al. | 705/14 |
| 2011/0119139 A1* | 5/2011 | Dean et al. | 705/14.73 |

OTHER PUBLICATIONS

"Document Clustering with Prior Knowledge," by Ji et al. In: SIGIR'06 (Aug. 6-11, 2006). Available at: ACM.*

"Multi-Faceted Information Retrieval System for Large Scale Email Archives," by Perkio et al. In: Proc. of the 2005 IEEE/WIC/ACM Int'l Conf. on Web Intelligence (2005). Available at: IEEE.*

(Continued)

*Primary Examiner* — Neveen Abel Jalil
*Assistant Examiner* — Daniel Kinsaul

(57) ABSTRACT

A method and apparatus for targeting messages to users in a social network, for example by first identifying topics in the social network is provided. One embodiment of a method for discovering topics in a social network includes collecting information from the social network, the information including at least one of: interactions between users of the social network or profile information for the users, determining a global topic model including at least one topic, based on the collected information, and locally refining the global topic model in accordance with the collected information.

36 Claims, 3 Drawing Sheets

OTHER PUBLICATIONS

"Online Social and Business Networking Communities," by Murchu et al. In: DERI Technical Report Aug. 1, 2004. Available at: http://www.deri.ie/fileadmin/documents/DERI-TR-2004-08-11.pdf.*

"Ontologies are Us: A Unified Model of Social Networks and Semantics," by Mika, Peter. In: Lecture Notes in Computer Science vol. 3729 (2005) pp. 522-536. Available at: SpringerLink.*

* cited by examiner

METHOD AND APPARATUS FOR TARGETING MESSAGES TO USERS IN A SOCIAL NETWORK

CROSS REFERENCE TO RELATED APPLICATIONS

This application claims the benefit of U.S. Provisional Patent Application Ser. No. 60/887,778, filed Feb. 1, 2007; and Ser. No. 60/892,824, filed Mar. 2, 2007. Both of these applications are herein incorporated by reference in their entireties.

REFERENCE TO GOVERNMENT FUNDING

This invention was made in part with Government support under contract number NBCHD030010, awarded by the Department of the Interior National Business Center. The Government has certain rights in this invention.

COMPUTER PROGRAM LISTING APPENDIX

A computer program listing illustrating source code for an exemplary embodiment of the present invention is provided herewith as Appendix I through Appendix XIII, which is herein incorporated by reference in its entirety.

COPYRIGHT PROTECTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to the field of computer networking, and relates more specifically to the field of targeted messaging to users of network communications.

SUMMARY OF THE INVENTION

A method and apparatus for targeting messages to users in a social network, for example by first identifying topics in the social network is provided. One embodiment of a method for discovering topics in a social network includes collecting information from the social network, the information including at least one of: interactions between users of the social network or profile information for the users, determining a global topic model including at least one topic, based on the collected information, and locally refining the global topic model in accordance with the collected information.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention relates to a method and apparatus for targeting messages to users in a social network. Although embodiments of the invention are described in the context of advertisement distribution, it is to be appreciated that the present invention may be applied to the distribution of any type of message, including non-commercial messages such as recommendations (e.g., restaurants, movies, music, news articles, web pages, or the like) that a user or group of users might like based on their interactions.

Figure 1:
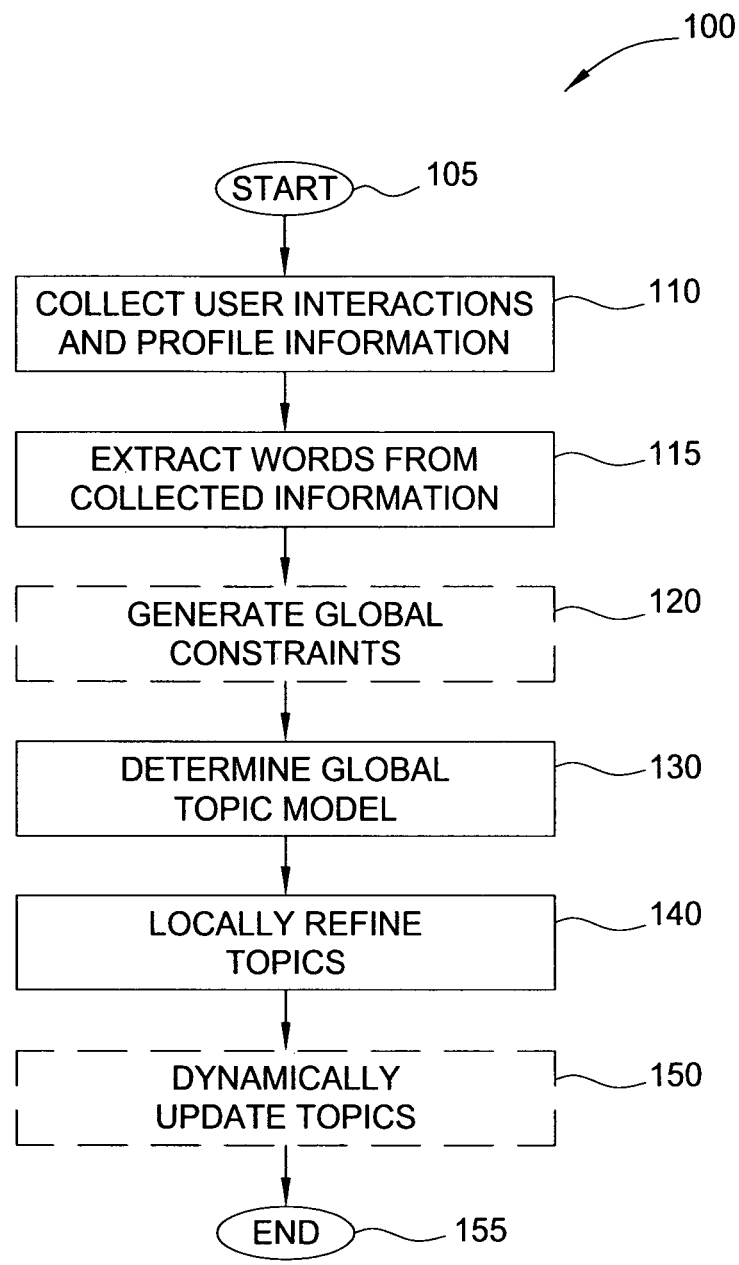
FIG. 1 illustrates a flow diagram that depicts one embodiment of a method for determining groups of users and topics, according to the present invention.

FIG. 1 illustrates a flow diagram that depicts one embodiment of a method 100 for determining groups of network users and topics, according to the present invention. For instance, the method 100 may be implemented to extract groups and topics from interactions observed in a social network. For the purposes of certain steps of the method 100, the network is represented as a graph in which the nodes represent network users and edges represent the relationships or connectivity among the nodes (e.g., explicit relationships such as "friend" or implicit relationships such as those formed through reference or comment).

The method 100 is initialized at step 105 and proceeds to step 110, where the method 100 collects information from the network. In one embodiment, the collected information includes: interactions between a plurality of network users in the network and profile information about the network users. In one embodiment, interactions collected include at least one of: a piece of electronic mail, an instant message, a posting to a website or to a blog, a comment or a tag made on a website or blog, and an online forum discussion posting. In one embodiment, the collected profile information includes: data about a network user that was posted (e.g., to a web site) by the network user, data provided by the network user as part of a registration process (e.g., published or unpublished information provided to a website for purposes of setting up a posting account), and data collected about the network user from other sources (e.g., other network users, other web sites, public records). Profile information includes both free-form text and categorized or typed information (e.g., demographic information such as age, location, gender).

In one embodiment, a data sampling approach is employed in accordance with step 110. In this case, a subset of interactions and/or network users is monitored (as opposed to collecting all interactions between all network users, and collecting profile information of every network user). In one embodiment, the subset of interactions is randomly selected.

In step 115, the method 100 extracts words and sequences of words (n-grams) contained in the collected interactions. In one embodiment, the words and n-grams are mapped into an ontology, e.g., to determine a normalized set of concepts, as described later herein with respect to FIG. 2.

In another embodiment, field-specific attributes are extracted from the profile information. For example, data relating to "music," "movies," "books," "age," or the like may be extracted. In a further embodiment, as part of the extraction step 115, a classifier examines the collected interactions with respect to the extracted field-specific features to obtain weights of the field-specific features relative to links between the interactions. The resultant weights provide a measure of how discriminative a particular profile attribute type is in predicting interaction links. In an alternative embodiment, these weights are predetermined rather than calculated by a classifier.

In optional step 120 (illustrated in phantom), the method 100 generates a set of global soft constraints with associated penalties. The global soft constraints are used to bias subsequent global topic model searches (described in further detail below with respect to step 130) toward a desired solution. In other words, a subsequent search attempts to optimize for the lowest penalty provided by the global soft constraints. In one embodiment, global soft constraints are generated from a set of initial rules or assumptions over all sets of users. For example, an initial rule could dictate that users who share similar musical tastes form a group, or that users of the same age living in the same locality form a group. In a further example, an initial rule could describe an assumption that a particular set of words describes a topic.

In step 130, the method 100 determines a global set of topics, based on the profile information collected in step 110. In one embodiment, the global set of topics is determined in accordance with a generalization of the spherical KMeans algorithm described in "*Concept Decompositions for Large Sparse Text Data using Clustering,*" by I. S. Dhillon and D. S. Modha in *Machine Learning*, vol. 42:1, pp. 143-175, January 2001, which is incorporated herein by reference.

In this embodiment, an iterative algorithm that starts with an initial topic assumption is used to determine the global set of topics, where a topic comprises a group of words and phrases that are considered related to the same concept. In order to determine the set of global topics in accordance with step 130, the method 100 first creates a group of people (e.g., network users), for example by performing clustering based on a similarity measure (such as cosine similarity) of normalized feature vectors constructed from the profile information to the current (initial) topics. For typed profile information, the information types are taken into account by creating a composite feature vector that combines the feature vectors of each information type, performing normalization, and considering a weighted combination of the similarities across different information types in the clustering.

For each group created, the method 100 next infers the topic of the group by calculating the centroid of the feature vectors of the group. The inferred topics may, in turn, be used in place of the initial topic assumption to create new groups. In one embodiment, iterations of group creation and topic inference are continued until the difference between successive estimates of an objective function (calculated using the inferred topics) is less than a pre-determined threshold. In alternative embodiments, other convergence criteria, such as an iteration counter (where iteration is deemed complete after a pre-determined maximum number of iterations have been performed), are used to determine how many iterations are necessary.

Once the clustering iterations are complete, the method 100 performs post-processing on the output (inferred topics) to merge similar topics, for example using complete-link hierarchical clustering based on cosine similarity. The post-processing outputs a reduced set of merged global topics, with each person (e.g., network user) being assigned to a single topic. In an alternative embodiment (where an expectation maximization (EM) algorithm is used instead of KMeans-type assignment in the determination of the global set of topics), a user may be probabilistically assigned to multiple topics, and a probabilistic merging is performed in the post-processing step. One exemplary EM-type algorithm that may be advantageously implemented in accordance with step 130 is described in "*Maximum likelihood from incomplete data via the EM algorithm,*" by Dempster, A. P., Laird, N. M., and Rubin, D. B. in the Journal of the Royal Statistical Society, B, 39, 1-38, 1977, which is incorporated herein by reference.

Once the global topic model is determined, the method 100 proceeds to step 140 and performs local refinement for each topic, using the collected interaction data. For each topic output by step 130, the method 100 determines a connection network among the members of the group from which the topic was inferred, to determine a relative "strength" of relationships among the users in the network (e.g., by considering the number of interactions).

For each topic, the collected interactions are filtered according to the given topic (e.g., the frequency of the topic words and/or phrases appearing in the interactions, where the weight of a link after the filtering is proportional to the projection of the words contained in the interaction on the topic under consideration). Partitions of the graph representing the network are created based on the link weights and the graph topology, for example by using a graph clustering algorithm that performs model selection (i.e., automatically selects the right number of graph clusters), such as the Markov Cluster (MCL) algorithm described by Stijn van Dongen in "*Graph Clustering by Flow Simulation,*" Ph.D. thesis, University of Utrecht, May 2000, which is incorporated herein by reference.

The method 100 then computes sub-topics within each global topic, by using the iterative clustering algorithm described above with respect to step 130, but also including the links within each graph partition as additional constraints (e.g., by using a semi-supervised clustering model like the Hidden Markov Random Field (HMRF) described in "*A Probabilistic Framework for Semi-Supervised Clustering,*" by Sugato Basu, Mikhail Bilenko, and Raymond J. Mooney in the *Proceedings of the* 10*th ACM SIGKDD International Conference on Knowledge Discovery and Data Mining* (KDD-2004), Seattle, Wash., August 2004, which is incorporated herein by reference). In the cluster assignment step, the method 100 may use either a fast (but less accurate) greedy intracluster medium (ICM) algorithm for inference, or a slower (but more accurate) message passing algorithm using loopy belief propagation—this allows a trade-off between the efficiency of the inference algorithm and the quality of the final result, as discussed, for example, in, "*A Comparison of Inference Techniques for Semi supervised Clustering with Hidden Markov Random Fields,*" by Mikhail Bilenko, and Sugato Basu in *Proceedings of the ICML*-2004 *Workshop on Statistical Relational Learning and its Connections to Other Fields* (SRL-2004), Banff, Canada, July 2004, which is incorporated herein by reference.

The method 100 then filters the refined clustering results by: (i) rank ordering the topics in terms of their quality (cluster coherence); and (ii) rank ordering the words and/or phrases in the topic using a score comprising the feature weights in the topic centroids and mutual information of the features with respect to the cluster partitioning. The filtered clusters thereby provide an improved set of descriptive and discriminative words for a topic.

In optional step 150 (illustrated in phantom), the method 100 dynamically updates the clusters of topics and users as more information becomes available from the social network (e.g., in terms of additional collected interactions between the users, additional profile information, and the addition of new users to the social network). In one embodiment, the global topics and user groups are incrementally updated, using a hybrid algorithm that interleaves online clustering on incremental data streams with periodic offline clustering on batch data, for example as described in "*Topic Models over Text Streams: A Study of Batch and Online Unsupervised Learning.*" by Arindam Banerjee, Sugato Basu in *Proceedings of the SIAM International Conference on Data Mining* (SDM-2007), Minneapolis, Minn., April 2007, which is incorporated herein by reference. The local refinement algorithm implemented in accordance with step 140 is then periodically performed again, when the number of links added/deleted for a user's collected interactions crosses a predetermined threshold, such threshold being provided as an input to the algorithm.

The method 100 terminates in step 155.

Figure 2:
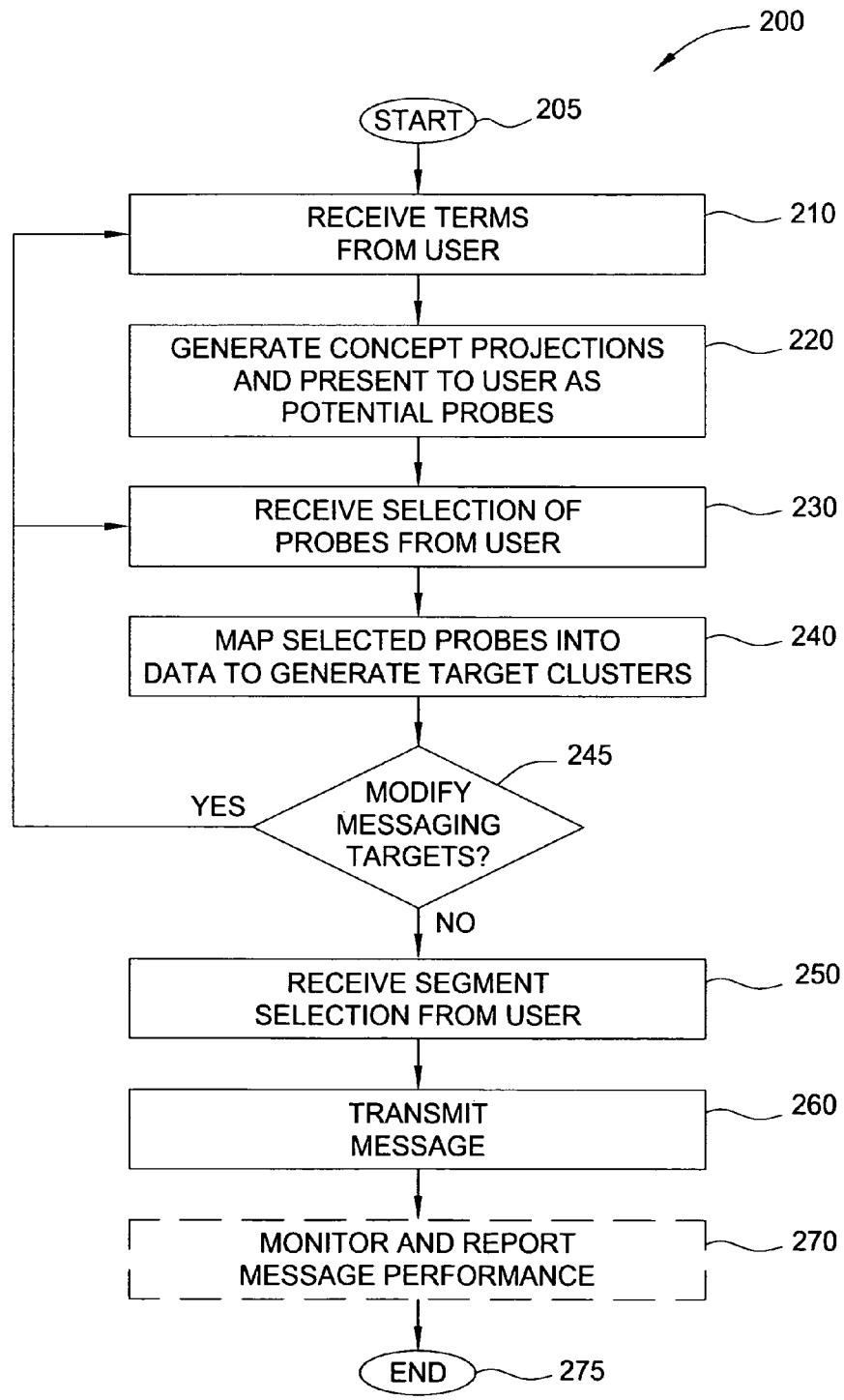
FIG. 2 illustrates a flow diagram that depicts one embodiment of a method for targeting messages, according to the present invention.

FIG. 2 illustrates a flow diagram that depicts one embodiment of a method 200 for targeting messages, according to the present invention. The method 200 may be implemented, for example, by an advertiser wishing to distribute an advertising message to a group of consumers (e.g., social network users) who are most likely to be interested in the advertised product or service.

The method 200 is initialized at step 205 and proceeds to step 210, where the method 200 receives from a user (e.g., an advertiser) a set of one or more terms (keywords) representing a proposed item of advertising (e.g., words descriptive of a product). The terms can include phrases (i.e., groups of words) and independent words, and may be a single word.

At step 220, the terms received in step 210 are projected into at least one ontology source, to determine a normalized set of concepts represented by the received terms. An ontology source in this context represents a data source that describes the relationships of particular terms to concepts (e.g., the words used to describe a particular concept in an encyclopedia), and may further relate the described concepts to one another. Exemplary ontology sources that can be used for this purpose include community-generated content such as general encyclopedias (e.g., Wikipedia®), directories (e.g., the Open Directory Project), and topic-specific encyclopedias (e.g., the Internet Movie Database). Domain-specific ontologies and/or dictionaries can also be used as ontology sources, whether general or topic-specific (e.g., medical dictionaries and legal dictionaries).

As discussed above, the ontology source(s) into which the terms received in step 210 are projected may include one or more community-generated ontology sources. Community-generated ontology sources are typically the result of iteration, modification, and refinement by a group of community members, such that the resulting data represents a consensus of the community on the meanings and relationships of the particular represented terms, topics, and concepts. As such, community-generated ontology sources may comprise a valuable resource within the context of the method 200, where a goal is to normalize the user's terms or keywords in light of what the terms mean to the target community. A community-generated source that was made by the target community may include some of the richest data for use in determining how members of the target community are likely to interpret messages the user targets to them.

In one embodiment, the method 200 performs a separate projection of the user's terms into each target ontology source. The projections are presented to the user in order to give the user a feel for the type of probes that will be subsequently used to analyze on-line conversational content. In this context, "probe" refers to the use of the projections into the ontology sources as patterns to explore the space of network user-generated content.

At step 230, the method 200 receives a selection of probes from the user. The probes selected comprise the user's set of desired probes, selected from the one or more of the projections presented in step 220. As discussed with respect to step 220, the probes are used as initial patterns for exploring the space of network user-generated content.

At step 240, the method 200 maps the probes selected by the user in step 230 into a set of data representing interactions between network users (e.g., potential advertising targets). For instance, the selected probes may be mapped into the social network structures of network user-generated content web sites. This mapping yields clusters of messaging targets, namely, the people (e.g., network users) who are associated (with a relatively high probability) with the probed topics and hence are more valuable messaging targets (e.g., more likely to purchase the products depicted in an advertising message). The clusters that are developed in this step will typically be refinements of the topics that are generated from the initial projection in step 220, and will present the topic of the cluster (e.g., what the users within the cluster are discussing), information about the size of the cluster (e.g., the number of members and participation strength), and metrics about the interactions within the cluster (e.g., the frequency of interactions and temporal pattern). In one embodiment, the method 100 described earlier herein with respect to FIG. 1 is used to perform the mapping in accordance with step 240, with the probes forming an initial rule that will bias the topic model. The probes may also be used to post-process the topic words and/or phrases, in order to generate relevant categorical descriptors.

In step 245, the method 200 determines whether to modify the messaging targets. For example, the user may wish to change or modify the selection of messaging targets based the refinement information generated in step 240 (e.g., because of the discovered content or because of other information about the users associated with sub-topics). If the method 200 concludes in step 245 that the user does wish to modify the messaging targets, the method 200 returns to either step 210 (to receive new terms) or to step 230 (to receive a new selection of probes), depending on the user's selection, and proceeds as described above.

Alternatively, if the method 200 concludes in step 245 that the user does not wish to modify the messaging targets, the method 200 proceeds to step 250 and receives a segment selection from the user. The user selects desired target segments from the clusters presented in step 240, the selected segments being those associated with topic refinements that are of interest to the user. A segment for the purposes of the present invention may comprise an entire cluster or set of clusters, or filtered portions of one or more clusters (e.g., a credit card company may select a segment that comprises only those network users in the presented clusters who have a threshold credit rating). For example, consider a user that has indicated, through his or her initial selection, criteria concepts that match the concept/topic "football" in one of the ontology sources used in step 220. The social network-based clustering could then yield topic refinements (what users in the social network are discussing) such as "buying tickets for football games", "fantasy football leagues", and the like. Thus, in step 250, the user can select the messaging targets most likely to be in his or her message, for example football ticket buyers as opposed to fantasy football participants.

In step 260, the method 200 collects a message (e.g., a set of advertising copy) from the user. The message is then transmitted to the target segments identified in step 250 (e.g., the users participating in the social network conversations regarding the selected topic) through a network fulfillment process.

In optional step 270 (illustrated in phantom), the method 200 monitors the performance of the message provided to the messaging targets. This step may be useful, for example, where the message comprises advertising content. In some embodiments, the method 200 presents performance statistics to the user based on refined topic segmentation.

The method 200 terminates in step 275.

In some embodiments of method 200, steps 210 and 220 may be optional. For instance, the user may decide not to provide a set of representative keywords, rather to browse an ontology source (e.g., concept directory) directly to select target concepts that will guide a particular message placement. For example, without providing any keywords, but having selected Wikipedia® as the target ontology source, the user can chose the top-level Wikipedia® category of "Religion and belief systems" and the single associated sub-category of "Confucianism". In this way, without providing any keywords, the user has indicated the particular concept that should be used to guide the placement of a message. In this alternative (i.e., keyword-free) embodiment, steps 240, 250, 260, and 270 are executed in substantially the same manner as described above.

Embodiments of the present invention may be advantageously applied to the field of advertising, where an advertiser user may be enabled to build an advertising campaign incrementally, by first selecting target concepts and then monitoring how those concepts are active in user-generated data sources. The typical types of user-generated data sources that are examined are conversations, for example those that take place in so-called "social media" web sites, where users create web pages that contain text comments to others in the community.

Embodiments of the present invention thus allow an advertiser user to see relevant statistics about the community activity level associated with any given concept, for instance, in terms of audience size, posting frequency, and other communication intensity measures.

Figure 3:
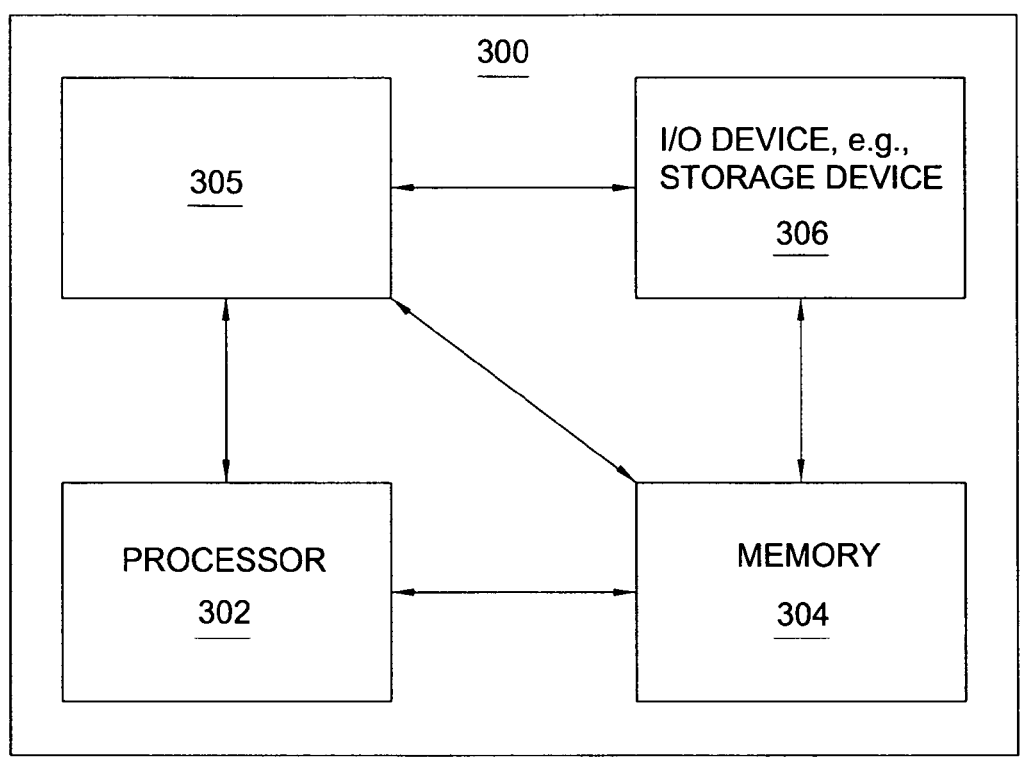
FIG. 3 is a high-level block diagram of the present method for targeting messages that is implemented using a general-purpose computing device.

FIG. 3 is a high-level block diagram of the message targeting method that is implemented using a general purpose computing device 300. In one embodiment, a general purpose computing device 300 comprises a processor 302, a memory 304, a message targeting module 305 and various input/output (I/O) devices 306 such as a display, a keyboard, a mouse, a stylus, a wireless network access card, and the like. In one embodiment, at least one I/O device is a storage device (e.g., a disk drive, an optical disk drive, a floppy disk drive). It should be understood that the message targeting module 305 can be implemented as a physical device or subsystem that is coupled to a processor through a communication channel.

Alternatively, the message targeting module 305 can be represented by one or more software applications (or even a combination of software and hardware, e.g., using Application Specific Integrated Circuits (ASIC)), where the software is loaded from a storage medium (e.g., I/O devices 306) and operated by the processor 302 in the memory 304 of the general purpose computing device 300. Thus, in one embodiment, the message targeting module 305 for monitoring and analyzing user communications, and targeting messages based thereon, as described herein with reference to the preceding Figures can be stored on a computer readable medium or carrier (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

Although various embodiments which incorporate the teachings of the present invention have been shown and described in detail herein, those skilled in the art can readily devise many other varied embodiments that still incorporate these teachings.

What is claimed is:

1. A method for sending a message in a social network, the method comprising:
   receiving from a source of the message or from a user a keyword relating to a subject of the message;
   retrieving from an ontology source a normalized set of concepts associated with the keyword, wherein the ontology source comprises at least one community-generated ontology source;
   collecting information from the social network, the information comprising one or more interactions between users of the social network and profile information for the users;
   identifying a subset of the information that corresponds to the normalized set of concepts, wherein the subset of the information is used to form a global topic model comprising at least one topic;
   sending the message to at least one of the users of the social network who is associated with the at least one topic; and
   dynamically updating the global topic model as new information is collected from the social network,
   wherein at least one of: the retrieving, the collecting, the identifying, or the dynamically updating is performed using a processor.

2. The method of claim 1, wherein the identifying comprises:
   iteratively defining the global topic model.

3. The method of claim 2, further comprising:
   assuming an initial topic model comprising at least one initial global topic;
   grouping the users into one or more groups, in accordance with the at least one initial global topic;
   inferring a topic for each of the one or more groups; and
   generating at least one new global topic based on one or more topics inferred for the one or more groups .

4. The method of claim 3, further comprising:
   merging one or more similar topics in a set of topics comprising the at least one new global topic.

5. The method of claim 4, wherein the merging results in each of the users being assigned to a single topic in a set of topics comprising the at least one new global topic.

6. The method of claim 4, wherein the merging results in at least one of the users being assigned to a plurality of topics in a set of topics comprising the at least one new global topic.

7. The method of claim 1, wherein the sending comprises:
   identifying, for the at least one topic, a connection among those of the users who are associated with the at least one topic.

8. The method of claim 7, wherein the identifying the connection comprises:
   filtering the one or more interactions according to the at least one topic.

9. The method of claim 1, wherein the one or more interactions comprise at least one of: a piece of electronic mail, an instant message, a posting to a website, a posting to a blog, a comment made on a website, a comment made on a blog, a tag made on a website, a tag made on a blog, or an online forum discussion posting.

10. The method of claim 1, wherein the profile information comprises at least one of: data posted by one or more of the users, data provided by one or more of the users as part of a registration process, or data collected from other sources.

11. The method of claim 1, wherein the collecting is performed in accordance with data sampling for a subset of the one or more interactions or a subset of the users.

12. The method of claim 1, wherein the normalized set of concepts biases the global topic model and is associated with at least one penalty.

13. The method of claim 1, wherein the ontology source comprises mapped words extracted from at least one of the one or more interactions and the profile information.

14. The method of claim 1, further comprising:
monitoring one or more performance statistics related to the message.

15. The method of claim 14, further comprising:
reporting the one or more performance statistics.

16. A non-transitory computer readable storage medium storing an executable program for sending a message in a social network, where the program performs steps of:
receiving from a source of the message or from a user a keyword relating to a subject of the message;
retrieving from an ontology source a normalized set of concepts associated with the keyword, wherein the ontology source comprises at least one community-generated ontology source;
collecting information from the social network, the information comprising one or more interactions between users of the social network and profile information for the users;
identifying a subset of the information that corresponds to the normalized set of concepts, wherein the subset of the information is used to form a global topic model comprising at least one topic;
sending the message to at least one of the users of the social network who is associated with the at least one topic; and
dynamically updating the global topic model as new information is collected from the social network.

17. The non-transitory computer readable storage medium of claim 16, wherein the identifying comprises:
iteratively defining the global topic model.

18. The non-transitory computer readable storage medium of claim 17, further comprising:
assuming an initial topic model comprising at least one initial global topic;
grouping the users into one or more groups, in accordance with the at least one initial global topic;
inferring a topic for each of the one or more groups; and
generating at least one new global topic based on one or more topics inferred for the one or more groups.

19. The non-transitory computer readable storage medium of claim 18, further comprising:
merging one or more similar topics in a set of topics comprising the at least one new global topic.

20. The non-transitory computer readable storage medium of claim 19, wherein the merging results in each of the users being assigned to a single topic in a set of topics comprising the at least one new global topic.

21. The non-transitory computer readable storage medium of claim 19, wherein the merging results in at least one of the users being assigned to a plurality of topics in a set of topics comprising the at least one new global topic.

22. The non-transitory computer readable storage medium of claim 16, wherein the sending comprises:
identifying, for the at least one topic, a connection among those of the users who are associated with the at least one topic.

23. The non-transitory computer readable storage medium of claim 22, wherein the identifying the connection comprises:
filtering the one or more interactions according to the at least one topic.

24. The non-transitory computer readable storage medium of claim 16, wherein the one or more interactions comprise at least one of: a piece of electronic mail, an instant message, a posting to a website, a posting to a blog, a comment made on a website, a comment made on a blog, a tag made on a website, a tag made on a blog, or an online forum discussion posting.

25. The non-transitory computer readable storage medium of claim 16, wherein the profile information comprises at least one of: data posted by one or more of the users, data provided by one or more of the users as part of a registration process, or data collected from other sources.

26. The non-transitory computer readable storage medium of claim 16, wherein the collecting is performed in accordance with data sampling for a subset of the one or more interactions or a subset of the users.

27. The non-transitory computer readable storage medium of claim 16, wherein the normalized set of concepts biases the global topic model and is associated with at least one penalty.

28. The non-transitory computer readable storage medium of claim 16, wherein the ontology source comprises mapped words extracted from at least one of the one or more interactions and the profile information.

29. The non-transitory computer readable storage medium of claim 16, further comprising:
monitoring one or more performance statistics related to the message.

30. The non-transitory computer readable storage medium of claim 29, further comprising:
reporting the one or more performance statistics.

31. Apparatus for targeting a message in a social network, the apparatus comprising:
means for receiving from a source of the message or from a user a keyword relating to a subject of the message;
means for retrieving from an ontology source a normalized set of concepts associated with the keyword, wherein the ontology source comprises at least one community-generated ontology source;
means for collecting information from the social network, the information comprising one or more interactions between users of the social network and profile information for the users;
means for identifying a subset of the information that corresponds to the normalized set of concepts, wherein the subset of the information is used to form a global topic model comprising at least one topic;
means for sending the message to at least one of the users of the social network who is associated with the at least one topic; and
means for dynamically updating the global topic model as new information is collected from the social network.

32. The method of claim 1, wherein the ontology source describes a relationship between the keyword and the set of normalized concepts.

33. The method of claim 32, wherein the ontology source further describes a relationship between concepts in the set of normalized concepts.

34. The method of claim 1, wherein the set of normalized concepts represents a meaning of the keyword to a specific subset of the users of the social network.

35. The method of claim 1, wherein the retrieving comprises:
   separately analyzing the keyword using plurality of ontology sources to produce a plurality of normalized sets of concepts;
   presenting the plurality of normalized sets of concepts to the source of the message; and
   receiving from the source of the message a selection of the normalized sets of concepts from among the plurality of normalized sets of concepts.

36. A method for selecting recipients to whom to send a message in a communication network, the method comprising:
   receiving a keyword from a source of the message or from a user, wherein the keyword relates to a subject of the message;
   analyzing the keyword in accordance with an ontology source, wherein the ontology source comprises at least one community-generated ontology source, and wherein the analyzing produces a normalized set of concepts associated with the keyword;
   searching a plurality of interactions between users of the communication network for interactions that relate to the normalized set of concepts, wherein the searching results in a cluster of users of the communication network who are associated with the normalized set of concepts;
   sending the message to at least one user in the cluster of users; and
   dynamically updating the normalized set of concepts as new information is collected from the communication network.

* * * * *